United States Patent [19]

Gainforth

[11] Patent Number: 4,986,057
[45] Date of Patent: Jan. 22, 1991

[54] APPARATUS FOR HANDLING AND WRAPPING BALES

[76] Inventor: Douglas Gainforth, R.R. #1, Wooler, Ontario, Canada, K0K 3M0

[21] Appl. No.: 265,773

[22] Filed: Nov. 1, 1988

[30] Foreign Application Priority Data

Sep. 7, 1988 [CA] Canada .................................. 576709

[51] Int. Cl.⁵ .............................................. B65B 11/04
[52] U.S. Cl. ........................................ 53/556; 53/389; 53/587; 242/75.4
[58] Field of Search ................. 53/211, 587, 588, 390, 53/389, 556; 414/24.5; 242/75.4, 75.46

[56] References Cited

U.S. PATENT DOCUMENTS

| | | | |
|---|---|---|---|
| 1,270,279 | 6/1918 | Ferres | 242/75.46 |
| 2,337,790 | 12/1943 | Williams | 242/75.4 |
| 4,583,900 | 4/1986 | Cooley | 414/24.5 |
| 4,606,172 | 8/1986 | Miller | 53/587 |
| 4,610,123 | 9/1986 | Krone | 242/75.4 X |
| 4,616,474 | 10/1986 | Morley | 53/588 X |
| 4,662,151 | 5/1987 | Mathes | 53/587 |
| 4,827,699 | 5/1989 | Shauman | 53/587 |
| 4,827,700 | 5/1989 | Rampe | 53/587 |

FOREIGN PATENT DOCUMENTS 2810124 9/1978 Fed. Rep. of Germany ........ 53/588

Primary Examiner—John Sipos
Attorney, Agent, or Firm—Berman, Aisenberg & Platt

[57] ABSTRACT

There is provided a new and useful bale wrapping apparatus comprising a frame, means mounted on the frame for engaging an end of, and lifting, a bale to be wrapped, means associated with the means for engaging for axially rotating the bale when the bale is supported on the means for engaging, a support beam mounted on the frame but offset therefrom for receiving a roll of wrapping material, the beam located radially outwardly of the bale and oriented substantially parallel to the axis of the bale, positioning means mounted on the beam and selectively positionable along the beam for accommodating preselected widths of wrapping material, the widths corresponding substantially to the width of the bale being wrapped, and tensioning means for varying the force required to be exerted on the wrapping material to cause the roll to rotate on the beam to unroll wrapping material.

12 Claims, 2 Drawing Sheets

APPARATUS FOR HANDLING AND WRAPPING BALES

This application relates to an apparatus for handling and wrapping bale such as round hay bales.

BACKGROUND OF THE INVENTION

There has been a move in recent years to utilize much larger bales on the farm. In particular, round hay bales have become popular because greater efficiencies in harvest time and labour efficiency can be realized than with conventional smaller bales of rectangular cross section. It has been the practice among many farmers to leave these bales uncovered either in the field or in storage areas about the farm. It was felt that the bales were so densely packed that moisture would not penetrate to a significant extent.

It has now been found that this exposure to the elements results in losses of twenty percent of the bale. These losses can be prevent by either covering the bales with a roof structure or by wrapping the bales in a plastic wrapping material.

It is not cost effective to construct a roofed area for protective storage of round bales. Furthermore, to date there has not been developed an entirely satisfactory means of wrapping the bales.

There has also been difficulty in obtaining apparatus with which the bales can be conveniently handled, stacked and unrolled for feeding.

Against this background an apparatus has now been devised which simplifies the wrapping operation and reduces the expense associated with that operation. At the same time a bale handling apparatus is incorporated with the wrapping arrangement.

PRIOR ART

A number of patents have issued which relate to various types of apparatus for handling and wrapping round bales. Canadian Patent No. 1,039,222, issued Sept. 26, 1978, to Dalman, illustrates an apparatus for dispensing hay from a circular bale. The bale is suspended on a probe for rotation and is dispensed in layers by a cutter which stretches along the bale and moves continuously through the hay toward the centre of the bale.

U.S. Pat. No. 4,120,405, issued Oct. 17, 1978, to Jones, et al., illustrates a basic fixed probe apparatus having a larger central probe and a series of smaller outer probes for lifting a round bale by impaling the end of the bale.

U.S. Pat. No. 4,343,132, issued Aug. 10, 1982, to Lawless, provides a bale wrapper having a rather complicated and apparantly impractical method of manipulating the bale for insertion of the probe.

U.S. Pat. No. 4,583,900, issued Apr. 22, 1986, to Cooley, illustrates a bale handling apparatus having a rotatable probe with a screw thread.

U.S. Pat. No. 4,594,836, issued June 17, 1986, to Good, illustrates a bale bagger for bagging fodder to be used as silage.

U.S. Pat. No. 4,606,172, issued Aug. 19, 1986, to Miller, illustrates a bale wrapping apparatus in which the bale is mounted on central and subsidiary probes and is rotated beneath a wrapping device.

U.S. Pat. No. 4,662,151, issued May 5, 1987, to Mathes, is again a rather complicated apparatus in which the bale is impaled on probes and rotated to a vertical orientation before being wrapped.

Applicant is also aware of a wrapping apparatus marketed by Unverferth Manufacturing Co. of Kalida, Ohio, which utlizes a fixed probe for impaling and lifting a bale and a wrapping apparatus utilizing a narrow strip of wrapping material in a number of overlapping passes around the bale.

None of the noted patents provides the features of the present invention.

BRIEF SUMMARY OF THE INVENTION

An apparatus has now been devised which enables round bales of various widths to be wrapped with a single width of wrapping material of approximately the width of the bale. Furthermore, the invention incorporates a tensioning device which maintains a substantial tension on the wrapping material roll so that the material adheres well to the bale and, when overlapped, to itself, to ensure that the wrapping will stay in place around the bale.

As well, the apparatus preferably provides sufficient tension that the wrapping material is actually stretched to a substantial extent so that the above advantages are obtained and, in addition, very substantially more bale can be covered per unit length of the rolled and unstretched wrapping material.

Thus, the invention provides a bale wrapping apparatus comprising a frame, means mounted on the frame for engaging an end of, and lifting, a bale to be wrapped, means associated with the means for engaging for axially rotating the bale when supported on the means for lifting, a support beam mounted on the frame but offset therefrom for receiving a roll of wrapping material, the beam located radially outwardly of the bale and oriented substantially parallel to the axis of the bale, positioning means mounted on the beam and selectively positionable along the beam for accommodating preselected widths of wrapping material, the widths corresponding substantially to the width of the bale being wrapped, and tensioning means for varying the force required to be exerted on the wrapping material to cause the roll to rotate on the beam to unroll wrapping material.

BRIEF DESCRIPTION OF THE DRAWINGS

In drawings which illustrate embodiments of the invention.

Figure 1:
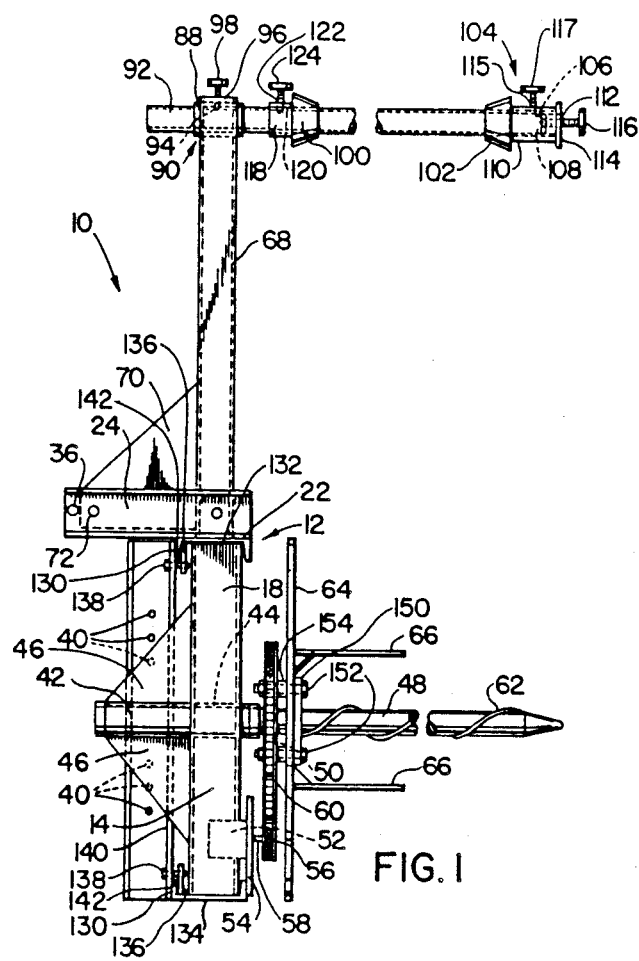
FIG. 1 is a side elevation partly in section of an apparatus according to the, invention.
Figure 4:
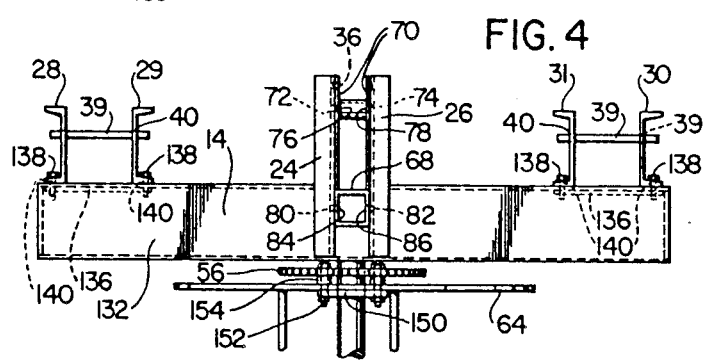
FIG. 4 is a top plan view partly in section of the apparatus of FIG. 1.
Figure 2:
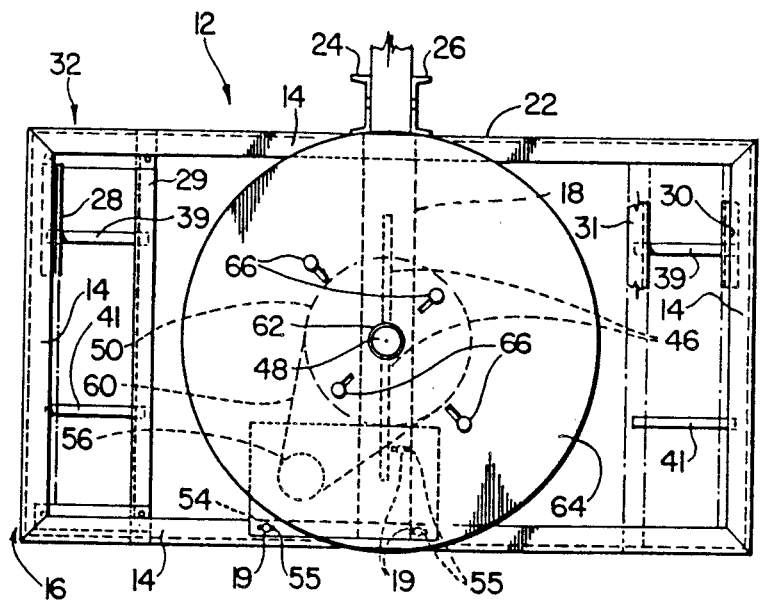
FIG. 2 is a front elevation of a frame for use with the apparatus of the invention.
Figure 3:
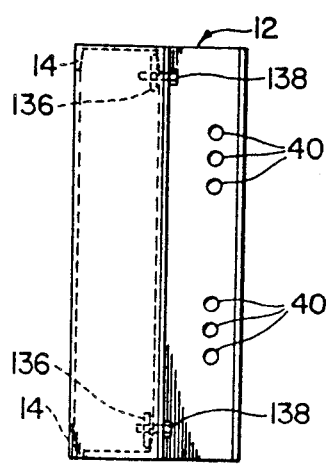
FIG. 3 is a side elevation of the frame of FIG. 2.

While the invention will be described in conjunction with an illustrated embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE PREFERRED EMBODIMENTS

The baling apparatus 10 is mounted on a frame 12 which is adapted to be secured to a standard three-point hitch or to a front end loader. The frame comprises U-shaped channel sections 14 joined end to end to form the rectangular frame section 16.

A square tubing section 18 is secured centrally of frame section 16.

A pair of channel sections 24 and 26 extend backwardly from surface 22 of the topmost of the channel sections 14.

Further pairs of channel sections 28 and 29, and 30 and 31 are located toward outer ends 32 and 34, respectively, of frame section 16. Channel sections 24 and 26 are provided with openings 36; and channel sections 28 and 29, and 30 and 31 are provided with a series of openings 40 and pins 39 and 41 for securing the frame 12 to the vehicle on which the apparatus is mounted.

In the case of mounting on a front end loader, the arms of the loader engage the pins 39 and 41. In the case of mounting on a three-point hitch, the hitch engages the pins 41 and is connected via a pin to openings 36 in channel sections 24 and 26. In both cases the apparatus is moveable through the full height range of the front end loader or three-point hitch as the case may be.

As indicated, the openings 40 provide adjustment for the pins 39 and 41. In order to provide adjustment for the width of different mounts, the channel sections 28 and 29, and 30 and 31 are slideable relative to frame section 14. The flanges 130 of the uppermost channel section 132 and lowermost channel section 134 of channel sections 14 serve as guide rails in this respect. A series of plates 136 are located on the inside of flanges 130 and are secured by bolts 138 to flanges 140 of respective ones of channel sections 28 and 29, and 30 and 31. When bolts 138 are loosened the channel sections 28 and 29, and 30 and 31 can be slid along flanges 130 to any desired position.

The bolts 138 are positioned adjacent the extremities 142 of flanges 130 to thereby prevent the channel sections 28 and 29, and 30 and 31 from disengaging from flanges 130.

A tube 42 preferably comprising a length of steel pipe is secured in position centrally of the frame section 16. Tube 42 passes through an opening 44 in the square tube section 18 and is thus supported by that square tube section. Rearwardly of the square tube section a pair of support webs 46 of triangular configuration are secured along one edge to the square tube section 18 and along a second edge to the tube 42.

The steel probe 48 is journaled for rotation in the tube 42.

A sprocket 50 is mounted on probe 48.

An hydraulic motor 52 is mounted on a plate 54 secured to frame section 16 and tube 18. A sprocket 56 is mounted on the motor shaft 58, and the sprocket 50 is thus driven by the hydraulic motor 52 via sprocket 56 and drive chain 60.

The motor mounting plate 54 is preferably secured to frame 16 and tube 18 by bolts 19. Plate 54 is provided with slots 55 which allow some adjustment of plate 54 relative to bolts 19 to thereby adjust the tension on drive chain 60.

A twisted steel rod 62 is secured in a spiral fashion along the probe 48 to provide a screw thread.

A backing plate 64 from which protrude a series of smaller probes 66 is positioned on probe 48.

A plate 150 is secured on the probe 48, preferably by welding. The backing plate 64 and the sprocket 50 are secured to plate 150 by a series of bolts 152. Spacers 154 maintain clearance between the backing plate 64 and the sprocket 50.

The probe 48, the sprocket 50 and the plate 150 are thus driven in rotation as a unit. This manner of joining these components permits easy disassembly should breakage of one part occur.

In operation this part of the apparatus is utilized to engage and lift a bale for handling and/or wrapping. The vehicle on which the apparatus is mounted is driven toward the bale and probe 48 is engaged for rotation. The rotation of probe 48, combined with the thread effect produced by the twisted rod 62, enables the probe 48 and the smaller probes 66 to be readily inserted into the bale. No difficulty is encountered nor do handling problems result from the fact that the shorter probes 66 rotate with the plate 64 and probe 48. Probes 66 readily rip into the bale over the small amount of rotation of the bale which occurs between their contact with the bale and their full insertion. The bale is then lifted through the conventional hydraulic system on the vehicle and is then ready for further manipulation.

The section of the apparatus now to be described comprises the wrapping material supporting, positioning and tensioning apparatus.

A post 68 comprised of a square tube section is removably supported on the uppermost channel section 132. A pair of support webs 70 extend between the post 68 and channel sections 24 and 26. A pair of openings 72 and 74 are provided in channel sections 24 and 26 and corresponding openings 76 and 78 are provided in webs 70. A further pair of openings 80 and 82 are provided in webs 24 and 26 and a corresponding pair of openings 84 and 86 are provided in the sides of post 68. Pins can then be inserted through these respective sets of openings to secure the post 68 in position.

A pipe section 88 is secured to the upper end 90 of post 68. A beam 92 preferably also comprising a pipe section is located for longitudinal sliding movement within pipe section 88. A threaded bore 94 is provided through the top plate 96 of post 68 and the side of pipe section 88 to receive a clamping bolt 98. The beam 92 can thus be secured in a desired position relative to post 68.

A pair of truncated conical members 100 and 102 are mounted on beam 92. As illustrated both members 100 and 102 are slidable along the beam 92. Maximum versatility and efficiency of the apparatus are achieved when both members are slidable. However, in some cases it may be sufficient that only one of the members 100 or 102 be slidable.

At the other end 104 of beam 92, beam 92 includes an end plug 106 which includes a threaded bore 108. A pipe section 110 also including a threaded bore 112 in an end plate 114 thereof is fitted over the end of beam 92. A bolt 116 secures pipe section 110 in position longitudinally and allows for a certain amount of positional adjustment of that pipe section.

A threaded bore 115 is provided through pipe section 110 to receive a clamping bolt 117 for securing pipe section 110 against rotation relative to beam 92.

Inwardly along beam 92 of conical member 100 is a slidable clamping member 118 comprising a pipe section 120 having a threaded bore 122 through the surface thereof. A bolt 124 in threaded bore 122 enables the clamping member 118 to be clamped at any desired position along the beam 92.

The wrapping apparatus operates as follows. The bolt 116 is backed off from the threaded bore 112 so that the pipe section 110 and the conical member 102 can be removed from the beam 92. A roll of wrapping material is then placed on the beam with the beam extending through the central spindle of the roll of wrapping material. The truncated conical members 100 and 102 are chosen such that the small or narrower end of the conical configuration is of smaller diameter than the diameter of the opening through the central spindle of the roll of wrapping material and the wider end of the conical configuration is of greater diameter than the diameter of the opening through the spindle.

Once the wrapping material has been placed on the beam, the conical member 102 and the pipe section 110 are replaced on the beam and secured against removal by the bolt 116. The conical member 100 is then moved toward the roll of wrapping material and is brought into contact with that roll such that the narrower part of the conical members 100 and 102 lies within the opening in the central spindle of the roll of material. Additional pressure is brought to bear against the conical member 100 to impart to the central spindle of the roll of material the desired frictional force tending to prevent turning of the roll. The conical member 100 is then secured in position by means of the clamping member 118.

In the most preferred case the truncated conical members 100 and 102 are welded to or otherwise made integral with clamping member 118 and pipe section 110 respectively.

The tensioning of the roll of wrapping material can then be fine tuned by adjustment of the bolt 116 to move the truncated conical member 102 toward or away from the roll. The desired tension will vary depending on the wrapping material used, but it should be such as to avoid transverse distortion of the material as it comes off the roll. This distortion is generally characterized by a drawing inward of the outer edges of the material.

Either before or after the wrapping material is positioned on the beam, the beam itself can be positioned relative to the post 68 so that the wrapping material will unroll in the proper position above a bale secured on the probe 48.

Clearly, the width of the wrapping material can be varied to suit the width of the bale.

Typically a plastic wrapping material is polyethylene having a thickness of 1.2 mm and an unstretched length of 5,000 feet. The material preferably includes ultra violet inhibitors.

To apply the wrap to a bale once the wrap and the bale are in position on the apparatus, the end of the wrap is drawn down to the bale and secured under the bale twine. The bale is then rotated by the probe 48 to wrap the bale and provide the desired overlap. In the preferred case the plastic is double lapped around the bale. The plastic is then cut, the bale positioned for storage and the probe withdrawn by reversing its rotation.

Thus it is apparent that there has been provided in accordance with the invention a bale wrapping apparatus that fully satisfies the objects, aims and advantages as set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A bale wrapping apparatus comprising:

a frame;

engaging means mounted on said frame for engaging and lifting a bale to be wrapped;

means associated with said engaging means for rotating said bale about an axis when said bale is supported on said engaging means;

a support beam mounted on said frame but offset therefrom for receiving a roll of wrapping material, for rotation with respect to said beam, wherein said support beam is located radially outwardly of said bale, extends in a direction substantially parallel to said axis, and is secured against rotation about its longitudinal axis;

tensioning means selectively positionable along said support beam for accommodating a plurality of different widths of wrapping material and for varying the force required to be exerted on said wrapping material, to place said material under stretching tension and allow said roll to rotate with respect said beam to unroll the wrapping material as said bale is rotated, wherein each of said widths corresponds substantially to the widths of a respective bale to be wrapped, and wherein said tensioning means comprises a pair of members mounted on said beam and adapted to exert a preselected frictional force against rotation on a center spindle of a roll of wrapping material mounted on said beam, at least one of said pair of members being slidable longitudinally of said beam, and a clamp associated with each of said slidable members for immovably fixing the position of each of said members along said beam and relative to said roll.

2. The apparatus of claim 5 wherein said clamp fixed at an end of said beam includes a section slidable over the end of said beam, wherein said clamp and said beam each include a threaded aperture in the adjacent outer ends thereof, and wherein said clamp is joined to said beam by a threaded member engaged through said apertures whereby to allow relatively minor adjustment of said clamp longitudinally of said beam.

3. The apparatus of claim 1 wherein said pair of members comprises a pair of truncated conical members having their narrow ends facing each other and having their narrow ends less than, and their wider ends greater than, the inside diameter of the centre spindle of a roll of wrapping material mounted on said beam.

4. The apparatus of claim 3 wherein each of said truncated conical members is slidable longitudinally of said beam.

5. The apparatus of claim 4 wherein said clamp associated with one said conical member is fixed at an end of said beam whereby one end of a roll of wrapping material mounted on said beam will be adjacent said end of said beam.

6. The apparatus of claim 1, 3, or 5 in which said beam is mounted on a post, which post is mounted on said frame, and wherein said beam is slidable relative to said post in the longitudinal direction of said beam.

7. The apparatus of claim 1 wherein said means for engaging comprises a rotatable probe mounted on said frame.

8. The apparatus of claim 7 wherein said probe is driven in rotation by an hydraulic motor.

9. The apparatus of claim 8 wherein said probe includes thread means on the exterior thereof to tend to draw said probe into said bale.

10. The apparatus of claim 9 wherein said means for engaging includes at least two additional probes offset from said rotatable probe.

11. The apparatus of claim 10 wherein said means for axially rotating comprises said rotatable probe and said two additional probes.

12. The apparatus of claim 1, or 3 wherein a roll of wrapping material is mounted on said beam and said pair of members are positioned relative to the centre spindle of said roll so as to cause material on said roll to be stretched as it is drawn from said roll.

* * * * *